United States Patent
Varney et al.

(10) Patent No.: US 7,637,712 B2
(45) Date of Patent: Dec. 29, 2009

(54) TRAY STACKING AND BUFFER SYSTEM AND METHOD OF USE

(75) Inventors: Barton Varney, Binghamton, NY (US); Michael A. Wisniewski, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 462 days.

(21) Appl. No.: 11/081,742

(22) Filed: Mar. 17, 2005

(65) Prior Publication Data

US 2006/0219610 A1 Oct. 5, 2006

(51) Int. Cl.
*B65G 57/30* (2006.01)
*B65G 37/00* (2006.01)
*B65G 1/00* (2006.01)
*B65H 29/00* (2006.01)

(52) U.S. Cl. .............. 414/795.2; 198/463.2; 198/347.2; 414/790.3; 414/793.5

(58) Field of Classification Search .............. 414/788.2, 414/790.9, 794.9, 618, 795.3; 198/347.3, 198/817, 801; 221/222
See application file for complete search history.

(56) References Cited

U.S. PATENT DOCUMENTS

| | | | | |
|---|---|---|---|---|
| 1,901,928 A | * | 3/1933 | Olson | 198/463.2 |
| 2,014,458 A | * | 9/1935 | Winkley | 198/426 |
| 3,340,992 A | * | 9/1967 | Seragnoli | 198/347.3 |
| 3,342,350 A | * | 9/1967 | Seragnoli | 414/788.8 |
| 3,658,194 A | * | 4/1972 | Gendron et al. | 414/795.6 |
| 3,718,267 A | * | 2/1973 | Hiebert et al. | 414/790.3 |
| 3,754,632 A | * | 8/1973 | Kreutter | 198/347.3 |
| 3,895,574 A | * | 7/1975 | Nyborg | 101/37 |
| 4,247,238 A | | 1/1981 | Imhäuser et al. | |
| 4,392,768 A | * | 7/1983 | Van Capelleveen | 414/278 |
| 4,602,774 A | * | 7/1986 | Kobler | 271/69 |
| 4,615,430 A | | 10/1986 | Satoh | |
| 4,778,323 A | * | 10/1988 | Salts | 414/795.3 |
| 4,830,170 A | * | 5/1989 | Focke | 198/347.3 |
| 4,865,515 A | * | 9/1989 | Dorner et al. | 414/788.2 |
| 4,936,735 A | | 6/1990 | Ryan | |
| 4,955,783 A | * | 9/1990 | Grazia | 414/795 |
| 5,253,745 A | | 10/1993 | van den Bergh et al. | |
| 5,263,635 A | | 11/1993 | Fitzgerald | |
| 5,494,214 A | | 2/1996 | Fleury et al. | |
| 5,601,395 A | * | 2/1997 | Lichti et al. | 414/807 |
| 5,906,468 A | | 5/1999 | Vander Syde et al. | |
| 6,035,973 A | * | 3/2000 | Neal et al. | 187/244 |
| 6,099,239 A | | 8/2000 | Klipp | |
| 6,201,203 B1 | | 3/2001 | Tilles | |
| 6,241,458 B1 | * | 6/2001 | Berndl | 414/790.3 |
| 6,422,806 B1 | * | 7/2002 | Jenkins et al. | 414/795.2 |
| 6,435,353 B2 | | 8/2002 | Ryan, Jr. et al. | |
| 6,494,295 B2 | * | 12/2002 | Grundmann | 187/292 |
| 6,846,153 B2 | * | 1/2005 | Schiesser et al. | 414/798.9 |

OTHER PUBLICATIONS

Patent Abstracts of Japan 11-180560.

* cited by examiner

*Primary Examiner*—Gregory W Adams
(74) *Attorney, Agent, or Firm*—Greenblum & Bernstein P.L.C.

(57) ABSTRACT

A system and method for stacking and storing a plurality of trays includes a stacker system and a buffer system. The stacker system includes a component, e.g., a platform, which moves a tray between a raised position and a lowered position. The buffer system includes a plurality of opposing projections for capturing the tray when the component is in the raised position.

24 Claims, 7 Drawing Sheets

FIG. 8

TRAY STACKING AND BUFFER SYSTEM AND METHOD OF USE

FIELD OF THE INVENTION

The invention generally relates to a system and method for storing trays and, more particularly, to a tray stacking and buffer system capable of storing trays in a buffer and ejecting such trays onto a conveyor, as required, and method of use.

BACKGROUND DESCRIPTION

The sorting of mail is a very complex, time consuming task. In general, the sorting of mail is processed through many stages, including back end processes, which sort or sequence the mail in delivery order sequence. These processes can either be manual or automated, depending on the mail sorting facility, the type of mail to be sorted such as packages, flats, letters and the like. A host of other factors may also contribute to the automation of the mail sorting, from budgetary concerns to modernization initiatives to access to appropriate technologies to a host of other factors.

Most postal facilities within the United States have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs and increasing mail throughput. However, certain processes are still manually performed such as, for example, the stacking and storage of mail trays for in subsequent operations.

By way of example, in front end processes, sorting and sequencing systems are capable of sequencing mail pieces and other product based on a two pass algorithm system. In one such known system, sorting devices include one or more feeders with feed rate capacities ranging from approximately 40,000 letters per hour and approximately 10,000 flats per hour. As the mail pieces are inducted into the system, they are first manually unloaded from trays. The trays are then placed onto a conveyor system which, in turn, transports the trays to a back end bin location or destination. Typically, two trays can be placed in each bin location.

During this processing, the mail may be processed by passing a camera, optical reading device, bar code scanner or other type of reading device used to read destination information from the mail pieces. This information is then provided to a control, which uses such information to coordinate the movements of the mail pieces to the predetermined bin locations, via diverters or other known systems. In a two pass system, the mail pieces are placed first in the sort order during this operational stage.

However, to complicate matters, there is typically more trays then available bin locations. So, in these instances, the trays become log jammed on the conveyor which, in instances, may affect the processing of the mail pieces. In these cases, an operator manually removes the trays from the conveyors, prior to entering the bin locations. The trays are then stacked on a pallet, near the conveyor, until a tray within one of the bin locations is removed. At such time, the operator has to reintroduce one of the trays from the pallet onto the conveyor for transport to the now empty bin location.

During this process, many trays become stacked on the pallet, since the amount of empty trays on the conveyor far outpaces the capacity of the sorting or sequencing machine. The stacks become unmanageable and take an inordinate amount of flooring space within the sorting facility. This in turn leads to increased costs due to, for example, the need for expensive flooring space, operator time or reduced machine throughput and lost efficiency.

The invention is directed to overcoming one or more of the problems as set forth above.

SUMMARY OF THE INVENTION

In a first aspect of the invention, a system is provided for stacking and storing a plurality of trays. The system includes a stacker system having a component which moves a tray between a raised position and a lowered position. The system further includes a buffer system having a plurality of opposing projections for capturing the tray when the component is raised from the lowered position to the raised position.

In a second aspect of the invention, the system includes a platform vertically moveable between a first position and a second position. The platform is designed to accommodate a tray. A first drive system connects to the platform for raising and lowering the platform between the first position and the second position. Opposing driven belts, each of which includes a plurality of spaced apart lugs, captures and stores the trays in a vertical, nested configuration. A second drive system connects to the opposing driven belts for synchronously rotating the belts of the opposing driven belts in opposing directions. A controller coordinates the movement of the opposing driven belts and the platform such that the platform is in the second position and the plurality of spaced apart lugs capture and lift the trays in a vertical, nested configuration.

In a third aspect of the invention, a method is provided for buffering trays. The method includes providing a tray onto a platform and raising the tray. The method further includes synchronizing movement of a buffering system with the raising of the tray such that when the tray is in the raised position, the tray will be captured by the buffering system. The tray is also lifted from the platform.

BRIEF DESCRIPTION OF THE DRAWINGS

FIG. 5 is an exploded view of FIG. 4a;

DETAILED DESCRIPTION OF A PREFERRED EMBODIMENT OF THE INVENTION

The invention is directed to a system and method for storing trays (also known as tubs) and, more particularly, to a tray stacking and buffer system which is capable of stacking trays in a buffered system and ejecting such trays onto a conveyor, as necessary. By using the system and method, high density storage of trays is possible thereby freeing valuable flooring space. The system is also modular which allows it to be fitted to known sorting and sequencing systems.

In one embodiment, the system is designed to place an empty tray onto a platen from a conveyor or transporting system. The platen raises the tray to a buffer system which is designed to capture, lift and store the tray in a nested and vertically stacked orientation. The system and method of the invention is also designed to induct the trays back onto a conveyor for further transportation to an end destination, as required. In this manner, manual operations need not be performed to stack and unload trays from and onto, respectively, a conveyor of a sorting or sequencing system. The system and method can also be implemented for warehousing applications and like.

Tray Stacking and Buffer System of the Invention

Figure 1A:
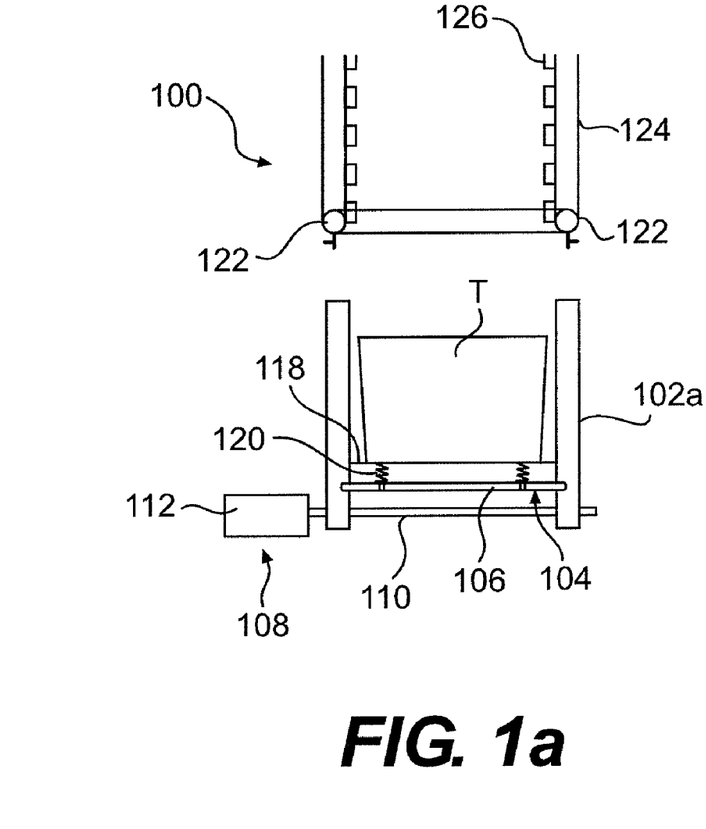
FIG. 1a is a front view of the tray stacking and buffer system in accordance with the invention.
Figure 1B:
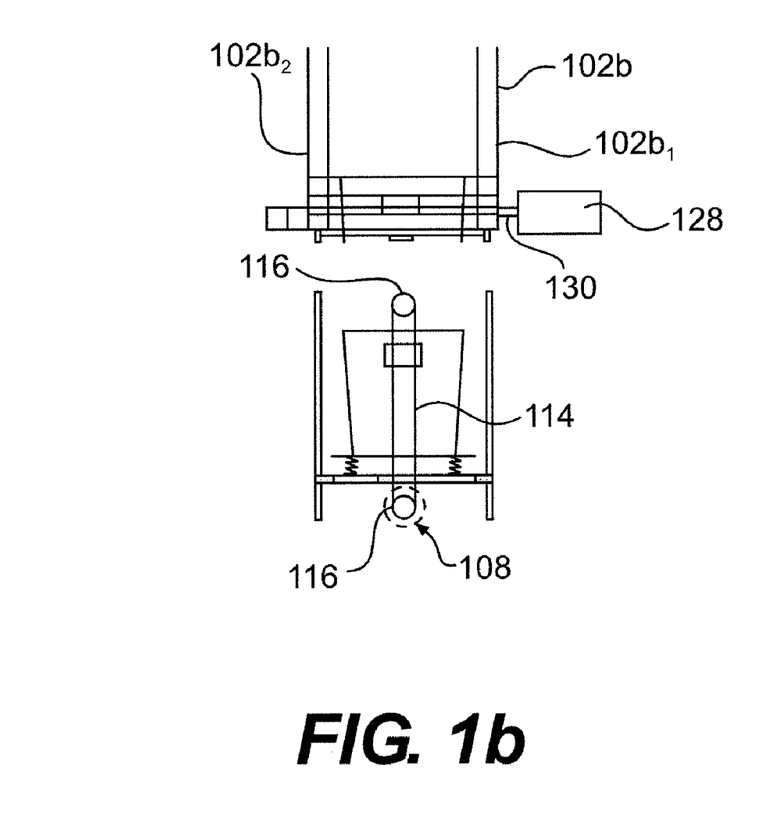
FIG. 1b is a side view of the tray stacking and buffer system in accordance with the invention.

Referring now to FIGS. 1*a* and 1*b*, a front and side view of the tray stacking and buffer system is shown. The tray stacking and buffer system is depicted generally as reference numeral 100 and includes a lower frame member 102*a* (comprising the stacker component) and an upper frame member 102*b* (comprising the buffer system). The upper and lower frame members 102*a* and 102*b* may be a single unit, in implementation. A moveable structure 104 is moveably mounted on the lower frame member 102*a* such that the moveable structure 104 can be raised and lowered in accordance with the operational stages of the tray stacking and buffer system 100, as described in greater detail below.

The moveable structure 104 includes a lower frame or plate 106 which is driven, e.g., raised and lowered, by a drive system 108. The drive system 108 includes, in one embodiment, a drive shaft 110 mounted between a drive motor 112 and a belt drive 114 such as a cogged belt. The drive belt 114 is fitted to respective sprockets 116 attached to the moveable structure 104. Upon energizing the motor 112, the drive shaft 110 will begin to rotate which, in turn, will drive the belt drive 114. The belt drive 114, being connected to the moveable structure by, for example, the sprocket 116, will raise and lower the moveable structure 104 in accordance with the different operational stages of the system. It should be understood that the drive system 108 may equally include a chain or be substituted with a linear actuator, stepper motor, rack and pinion gear system, hydraulic system, or other known drive system for raising and lowering the moveable structure 104.

The moveable structure 104 further includes a stacker plate or platform 118 for accommodating a tray "T" thereon. The platform 118 is preferably spring loaded on the frame 106 via a spring 120. The spring 120 may be used to maintain positive control of the tray to prevent compaction that will make the trays become wedged together and difficult to later separate., i.e., the spring loading ensures that the tray, when in the raised position, does not become wedged too tightly in a previously stored tray. The spring loading may also allow the platform 118 to expand, upwards, maintaining or holding the tray in a proper position until it is captured and raised by the buffer portion of the system (as discussed below). In one exemplary embodiment, the moveable structure 104 has an approximate 1.75 inch spring bottom. The platform 118, though, may equally be bolted to the frame 106.

Still referring to FIGS. 1*a* and 1*b*, a pair of shafts 122 is mounted between opposing frame members 102*b*$_1$ and 102*b*$_2$ of the frame member 102*b*, at a top portion and lower portion. A drive belt 124 is fitted about the shafts 122, each of which include a plurality of lugs or other projections 126 such as a hook shaped member extending therefrom at a predefined position. The lugs 126 or other projections are preferably positioned throughout the drive belts 124 and are separated by a distance which allows capture of trays without wedging the trays together too tightly so that they can later be removed from the system. The distance or separation of the lugs or other types of projection is thus a function of the tray being used with the system, and which can be readily calculated by those of ordinary skill in the art. For example, the lugs may be separated by a distance substantially equal to the space between the open handle of the tray and a top edge of the tray. The lugs or other types of projections 126 are designed to engage a handle, e.g., hole, within the trays, a lip of the tray or other portions of the tray in order to capture, raise and store the trays between the drive belts 124.

The shafts 122 and hence the drive belts 124 are driven by a drive system comprising a motor 128 and drive shaft 130. In one embodiment, a single drive shaft 130 is connected to both of the shafts 122. This ensures that both of the drive belts 124 will rotate at the same speed and in unison. A controller "C" may also be used to control the different components of the tray stacking and buffer system 100.

FIGS. 2*a*-4*b* show different operational stages of the invention. The steps of FIGS. 2*a*-4*b* may be implemented by the controller on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 2A:
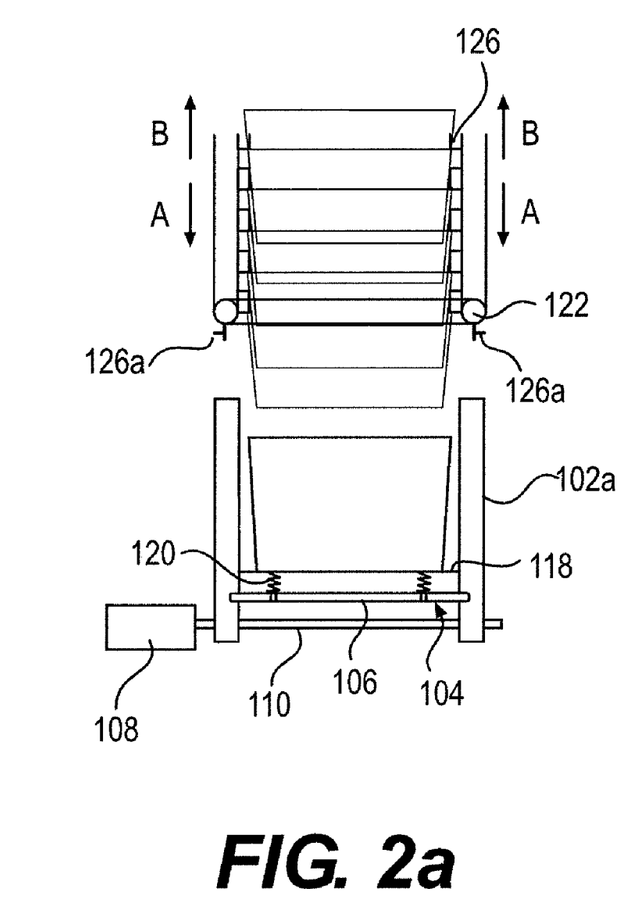
FIG. 2a is a front view of the tray stacking and buffer system in a tray loading operational stage in accordance with the invention.
Figure 2B:
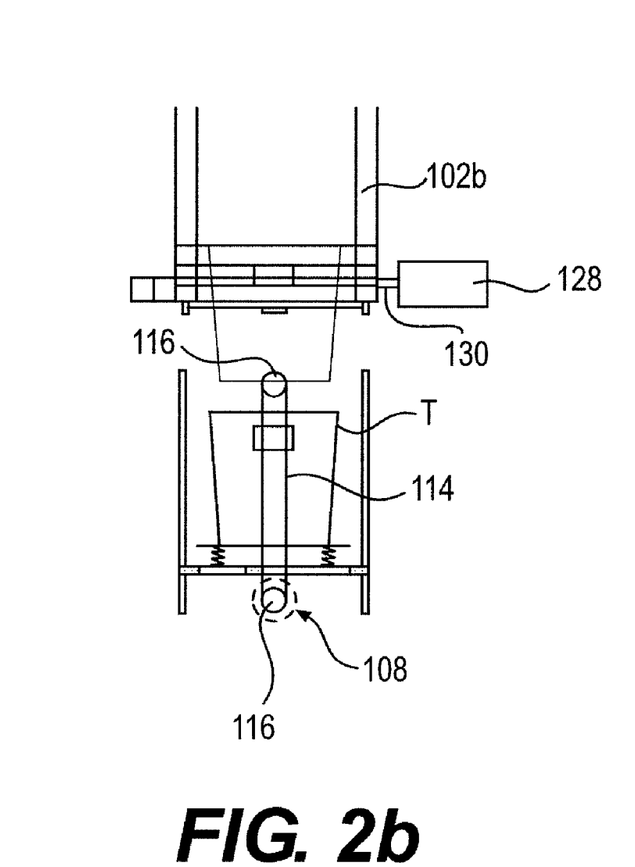
FIG. 2b is a side view of the tray stacking and buffer system in a tray loading operational stage in accordance with the invention.

In the operational stage of FIGS. 2*a* and 2*b*, a tray is initially placed on the platform 118 of the tray stacking and buffer system 100. As shown, a set of lugs or other types of projections, depicted as 126*a*, are positioned at a bottom portion of the belt drive 124. In this position, the lugs 126*a* will not interfere with the subsequent positioning of the tray, which is currently resting on the platform 118.

Also, FIGS. 2*a* and 2*b* show trays already captured by other lugs or other types of projections of the drive belts 124. That is, the trays are shown to be captured by the lugs or other types of projections 126 at the handles or other portions of the trays. Additionally, by having the lugs or other types of projections 126 at a predefined separation, the trays become nested with one another as the drive belts are rotated in the direction of arrow "A" Similarly, the trays can be removed by rotating the drive belts 124 in the direction of arrow "B".

Figure 3A:
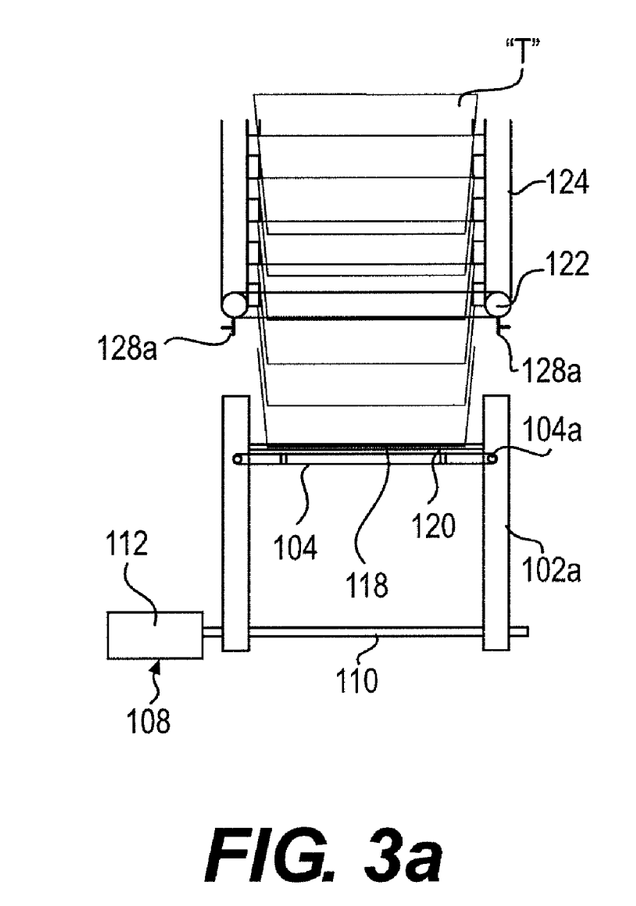
FIG. 3a is a front view of the tray stacking and buffer system in a raised operational stage in accordance with the invention.
Figure 3B:
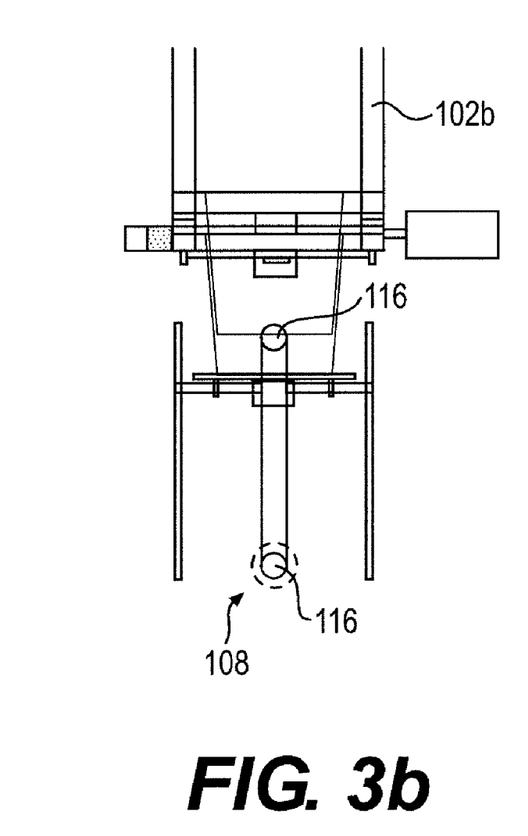
FIG. 3b is a side view of the tray stacking and buffer system in a raised operational stage in accordance with the invention.

In the operational stage of FIGS. 3*a* and 3*b*, the moveable structure 104 (and tray) is raised to a certain height. In this operational stage, the motor 108 is energized and the shaft 110 begins to rotate which, in turn, drives the chain drive 114. This will raise the tray to a predetermined height. The tray may be positioned by use of a mechanical stop. (FIG. 5) Also, the spring may be initially compressed and then subsequently expand, upwards, maintaining or holding the tray in a proper position until it is captured and raised by the lugs or other types of projections 126a. As the tray is properly positioned or soon thereafter, the drive belt 124 may begin to rotate, thus moving the lugs or other types of projections 126a into engagement with the tray.

In an alterative implementation, the moveable structure 104 may be raised by a stepper motor, linear actuator, hydraulic system, rack and pinion gear system or other known drive system for raising and lowering the moveable structure 104. In these systems, an exact amount of movement can be preprogrammed into the system, for example. Also, a sensor, e.g., photodiode, may be used to determine the exact height of the tray for storage. (The photodiode may be represented by the stop, as well.)

Figure 4A:
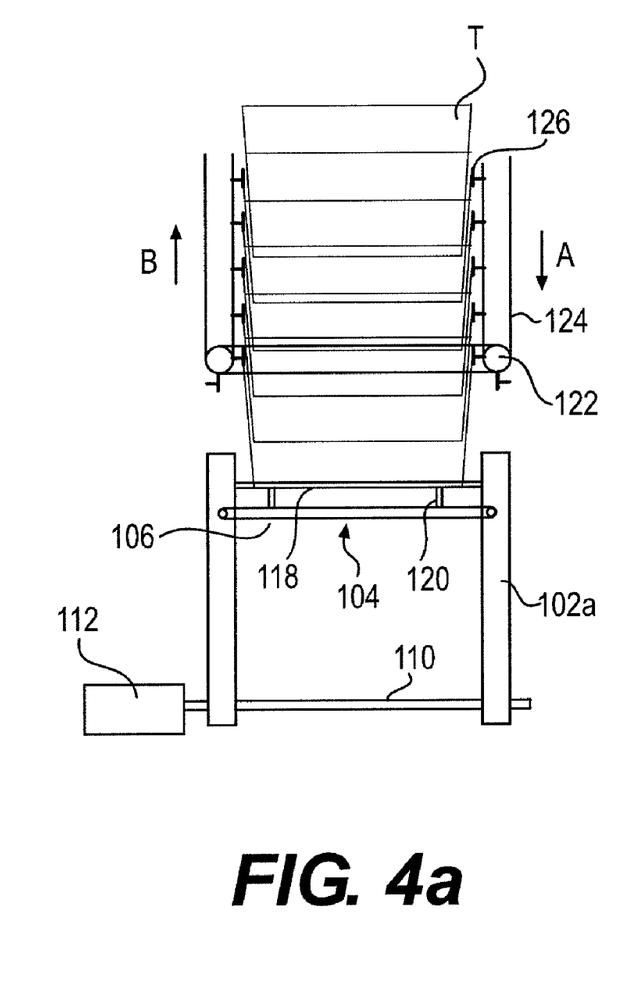
FIG. 4a is a front view of the tray stacking and buffer system in a capturing and storing operational stage in accordance with the invention.
Figure 4B:
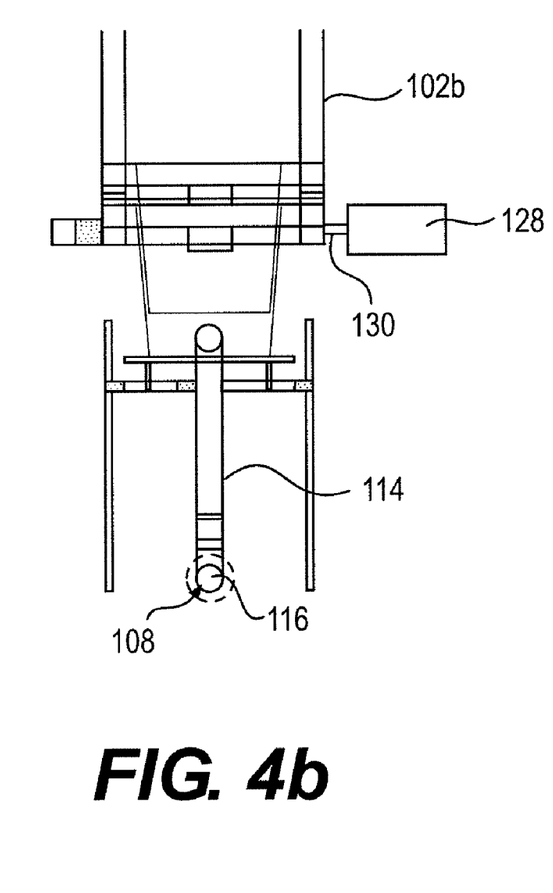
FIG. 4b is a side view of the tray stacking and buffer system in a capturing and storing operational stage in accordance with the invention.
Figure 5:
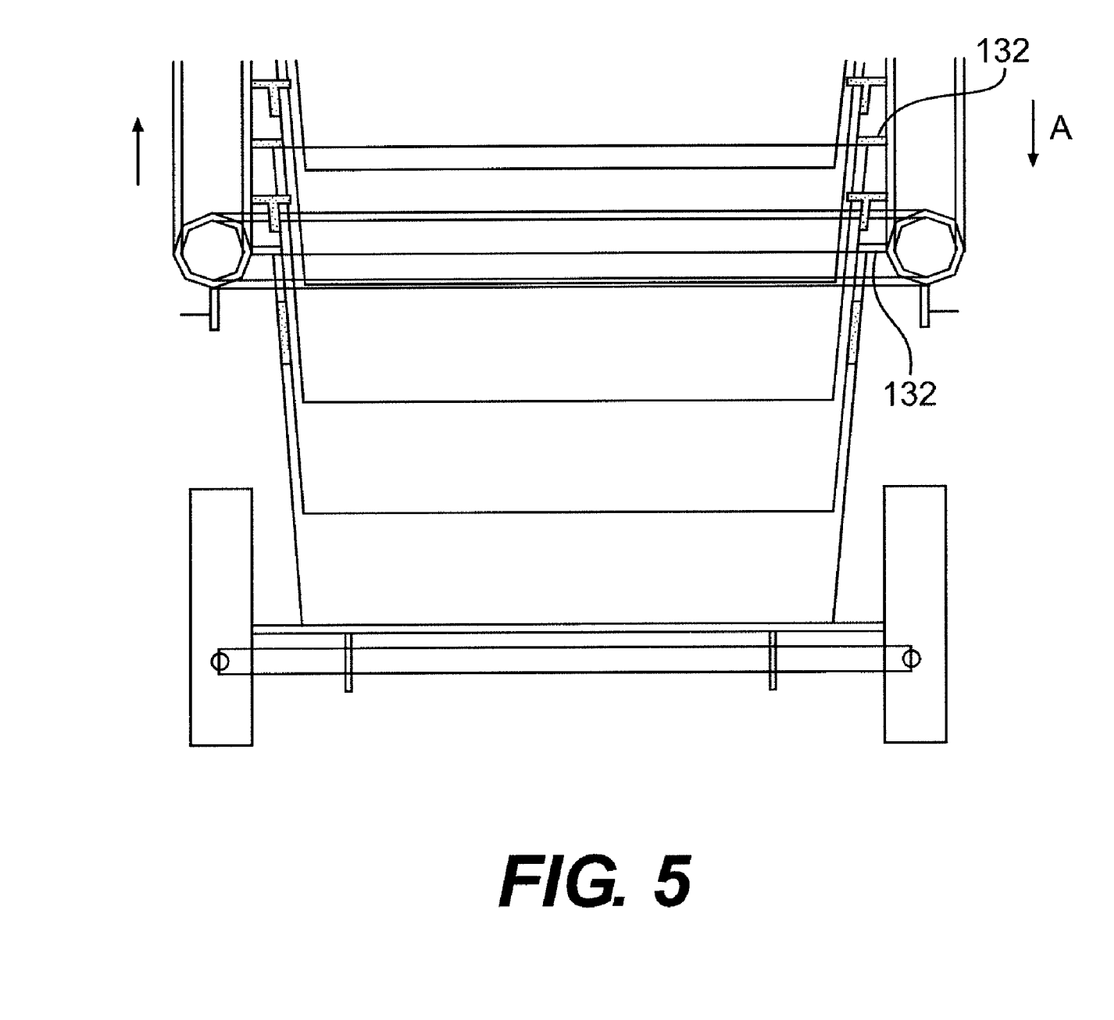

In the operational stage of FIGS. 4a-5, the tray is captured by the lugs or other projections 126. More specifically, when the moveable structure 104 is in the raised position of FIGS. 4a-5, the tray is positioned between the belt drives 124. The tray "T" is stopped, in one embodiment, by a mechanical stop 132, which contacts a lip of the tray "T". In this way, the mechanical stop 132 ensures that the tray is properly positioned for subsequent capturing by the lugs or other projections 126. Also, the spring loading allows the platform 118 to expand, upwards, maintaining or holding the tray in a proper position until it is captured and raised by the storing portion of the system (as discussed below).

When the tray is properly positioned, the belt drive 124 rotates in the direction of arrow "A" so that the lugs or other projections 126 will engage the handles or other portions of the tray "T". Once the lugs engage the tray, the tray will begin to rise from the platform 118 and nest with a previous tray in the system. In this manner, several trays may be buffered or stored, automatically, without operator intervention. In one approach contemplated herein, the movement of the moveable structure, belt drives and other components may be coordinated and/or synchronized by the controller "C".

Figure 6:
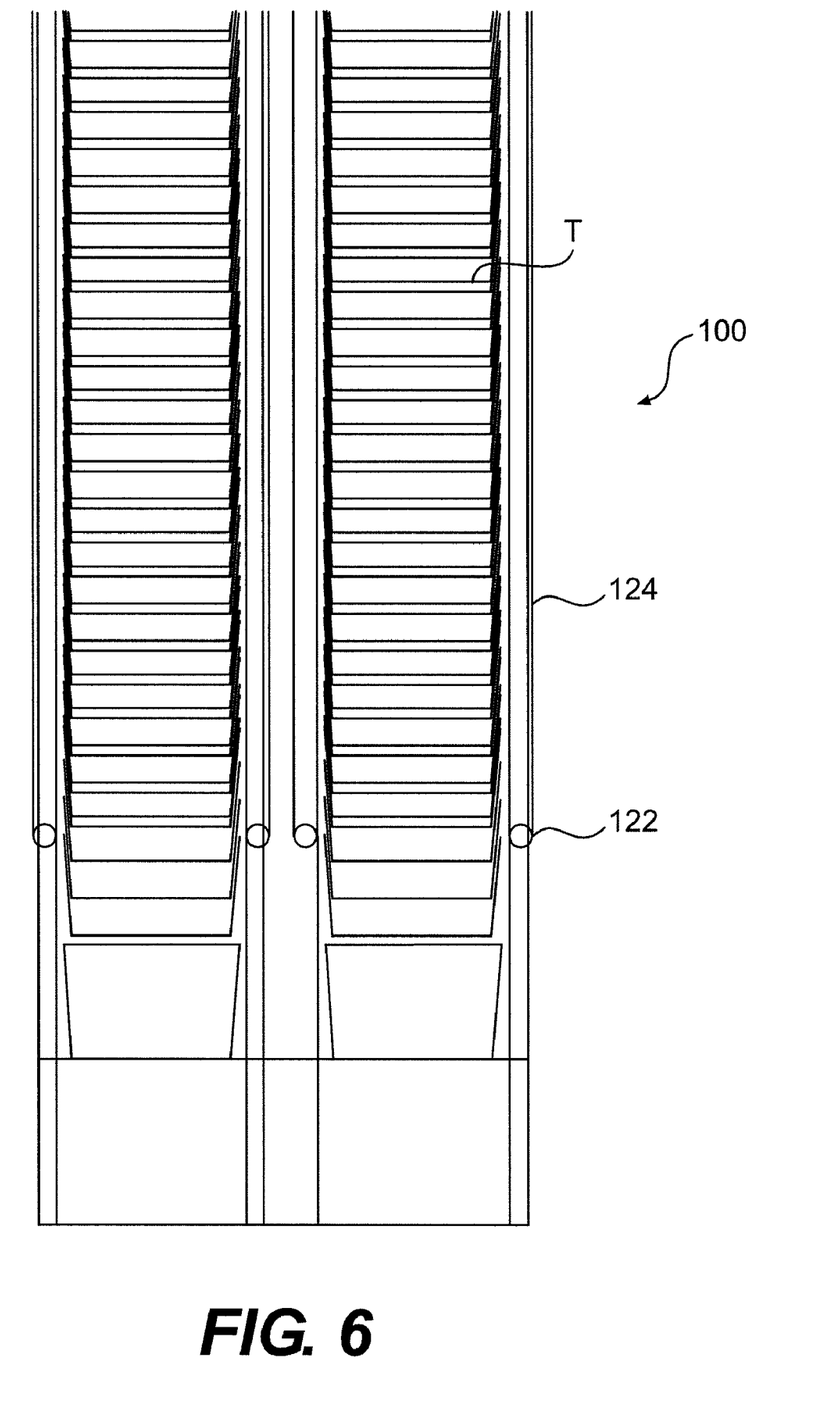
FIG. 6 is a front view of the tray stacking and buffer system with trays loaded therein in accordance with the invention.

The operational stages of FIGS. 2a-4b may be repeated by first lowering the moveable structure to a height of the conveyor. A new tray may be extracted from the conveyor and placed on the moveable structure to begin the operational stages of FIGS. 2a-4b. In operation, these operational stages may be repeated numerous times, with the only practical limitation being the height of the ceiling of the facility. In other words, the only limit to the height of the trays is the ceiling of any facility in which the system is used. Such a configuration is shown in FIG. 6.

Also, as should be understood, this process may be reversed in order to remove the trays from the tray stacking and buffer system 100 and place them on the conveyor, as required. By way of illustration, the belt drive 124 may be rotated in the direction of arrow "B". During this operational stage, the moveable structure 104 would be in the raised position to receive the tray as the tray is disengaged from the lugs or other projections 126. The tray would then be loaded onto the moveable structure 104, and the moveable structure 104 would be lowered to an approximate height of the conveyor. The tray would then be removed from the moveable structure 104 and inducted onto the conveyor.

Figure 7:
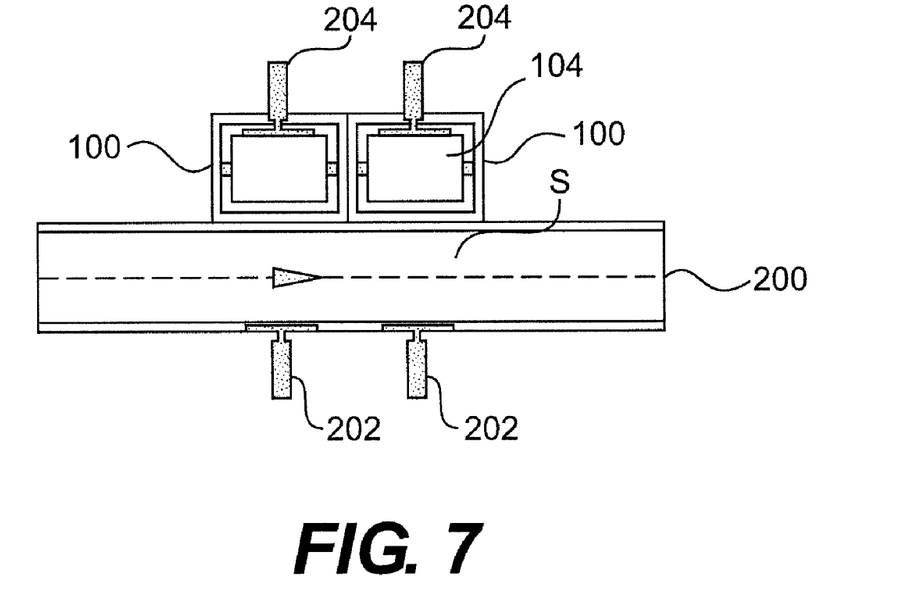
FIG. 7 is a top view of an embodiment and environment of use in accordance with the invention.
Figure 8:
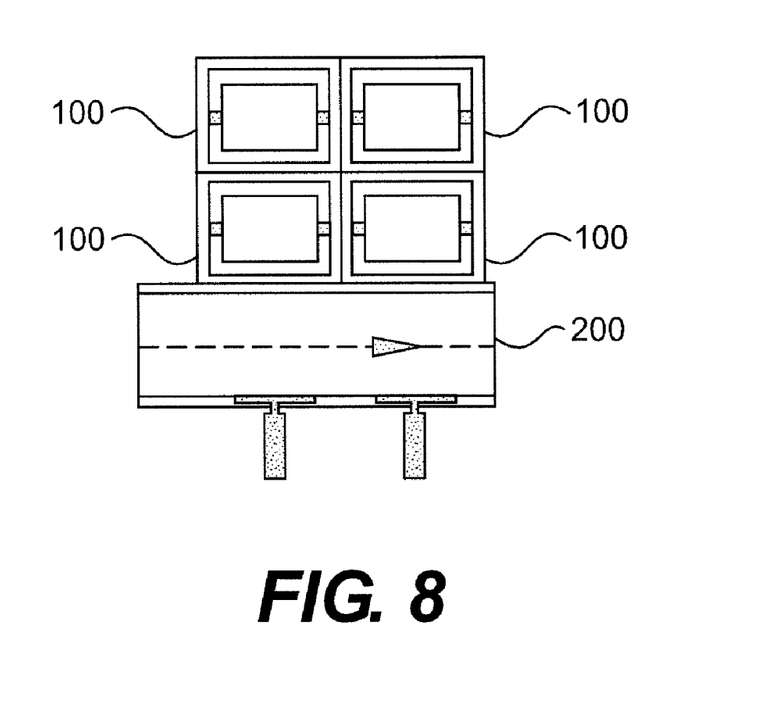
FIG. 8 is a top view of an embodiment and environment of use in accordance with the invention.

FIGS. 7 and 8 are top views of embodiments of the invention. In FIG. 7, two buffer systems 100 (e.g., duplex system) are arranged in a side-by-side configuration adjacent to a conveyor 200. In FIG. 8, four buffer systems 100 (e.g., quad system) are arranged in a side-by-side configuration adjacent to a conveyor 200. In both FIGS. 7 and 8, the height of the moveable structure 104, in the lowered position is the approximate height of the conveyor 200.

Referring back to FIG. 7, in operation, a tray may be extracted from the conveyor 200 and placed onto the buffer system and more particularly the moveable structure 104 via a pusher arm 202, e.g., hydraulic actuator, located on a remote side of the tray stacking and buffer system 100, adjacent the conveyor. A sensor such as, for example, a photodiode, or a counter (both represented as "S") may be used to determine the position of the tray and need for it to be ejected from the conveyor, as can be readily implemented by those of ordinary skill in the art. Once the tray is placed on the moveable structure 104, the steps shown in FIGS. 2a-4b may be performed.

The reverse steps may also be performed to remove the trays from the buffer system. By way of illustration, once the tray is placed on the moveable structure and lowered to the approximate level of the conveyor, the tray may be inducted back onto the conveyor 200 by push arm 204 located adjacent the tray stacking and buffer system 100. In the embodiment of FIG. 8 (as well as FIG. 7) the platform 118 of the moveable structure 104 may include drive rollers in order to induct the tray onto the conveyor. The drive rollers may also be interposed between the drive rollers of the conveyor in order to move the tray onto the platform 118.

While the invention has been described in terms of preferred embodiments, those skilled in the art will recognize that the invention can be practiced with modification within the spirit and scope of the appended claims.

We claim:

1. A system for stacking and storing a plurality of trays, comprising:
   a stacker system having a platform mounted to a movable frame member, wherein at least the platform moves a tray between a raised position and a lowered position by a lifting and lowering mechanism;
   a buffer system having a plurality of opposing projections projecting from opposing belts which are configured to capture the tray when the platform is raised from the lowered position to the raised position; and
   a component mounted between the frame member and the platform which is configured to be moved upward when the platform is in the raised position to maintain or hold the tray in a position until it is captured by opposing projections projecting from the opposing belts;
   wherein the component is a biasing system which is structured to maintain positive control of the tray and prevent compaction of nested trays of the plurality of trays already within the buffer system.

2. The system of claim 1, wherein the biasing system is a spring system.

3. The system of claim 2, wherein the spring system allows the platform to move, upwards, maintaining the tray in a position until it is captured by a set of the plurality of opposing projections.

4. The system of claim 1, wherein:
   the buffer system comprises an opposing belt driven system; and
   the plurality of opposing projections extend, inwardly, from driven belts of the opposing belt driven system at a predefined separation from one another.

5. The system of claim 4, wherein the opposing belt driven system comprises:
   a first driven belt;
   a second, opposing driven belt; and
   a single drive system for synchronously driving the first and second, opposing driven belts.

6. The system of claim 5, wherein the buffer system further comprises at least one stop mechanism to maintain a position of the tray when the tray is the raised position and prior to being captured by a set of the opposing projections.

7. The system of claim 1, wherein the stacker system comprises:
   a first member;
   a platform mounted to the first member by a spring; and
   a drive system for moving the platform between the raised position and the lowered position.

8. The system of claim 1, further comprising a controller to coordinate movement of the stacker system and the buffer system.

9. The system of claim 1, further comprising a push arm to push the tray from a conveyor onto the component when the platform is in the lowered position.

10. The system of claim 1, further comprising a push arm or drive mechanism to push the tray from the platform to a conveyor.

11. The system of claim 1, wherein:
    the buffer system includes opposing belts, each of the opposing belts include the plurality of opposing projections for engaging a portion of the tray on opposing sides of the tray; and
    at least one set of the plurality of opposing projections is positioned to not interfere with the tray as it is moved into the raised position and is moveable into engagement with the tray when the tray is in the raised position.

12. The system of claim 11, further comprising a controller coordinating, synchronously, the movement of a platform of the component and the opposing belt such that:
    the platform is moved into the raised position and the at least one set of the plurality of opposing projections are moved to capture the tray when the platform is in the raised position, and
    the at least one set of the plurality of opposing projections are moved to load the tray from the buffer system to the platform and the platform is moved to the lowered position.

13. The system of claim 1, wherein the plurality of trays hold mail pieces.

14. The system of claim 1, wherein the movable frame member is a plate, the biasing system is a spring and the spring is mounted between the plate and the platform.

15. The system of claim 14, wherein the plate and the movable frame member move in unison by a same drive mechanism.

16. The system of claim 15, wherein the same drive mechanism is mounted to the plate, and the movement of the plate will move the platform.

17. The system of claim 1, wherein the biasing system is a spring system mounting the platform to a frame member, and further comprising at least one stop mechanism provided on the opposing belts to maintain a position of the tray when the tray is in a second position and prior to being captured by the opposing projections projecting.

18. A system for stacking and storing trays, comprising:
    a platform vertically moveable between a first position and a second position, the platform accommodating a tray;
    a first drive system connecting to the platform for raising and lowering the platform between the first position and the second position;
    opposing driven belts each of which includes a plurality of spaced apart lugs extending partially inward such that a space is provided between spaced apart lugs on the opposing driven belts, the spaced apart lugs being structured for capturing and storing the trays in a vertical, nested configuration;
    a second drive system connecting to the opposing driven belts for synchronously rotating the belts of the opposing driven belts in opposing directions;
    a controller coordinating the movement of the opposing driven belts and the platform such that the platform is in the second position and the plurality of spaced apart lugs capture and lift the trays from the platform in a vertical, nested configuration;
    a spring system mounting the platform to a frame member, the spring system structured to prevent compaction of nested trays; and
    at least one stop mechanism provided on the opposing driven belts to maintain a position of the tray when the tray is the second position and prior to being captured by the plurality of spaced apart lugs.

19. The system for stacking and storing trays of claim 18, wherein the controller coordinates the movement of the opposing driven belts and the platform such that:
    the platform with a tray thereon is moved into the second position;
    the opposing driven belts are rotated in a first direction such that the tray is engaged with the opposing lugs of the plurality of spaced apart lugs on each of the opposing driven belts when the platform is in the second position; and
    the platform is lowered into the first position in order to place another tray on the platform.

20. The system for stacking and storing trays of claim 18, wherein the controller coordinates the movement of the opposing driven belts and the platform such that:
    an empty platform is moved into the second position;
    the opposing driven belts are rotated in a second direction to disengage some of the plurality of spaced apart lugs from the tray when the platform is in the second position; and
    the tray is loaded onto the platform and the platform is moved into the first position and the tray is removed from the platform.

21. The system for stacking and storing trays of claim 18, further comprising:
    a push arm to push the tray from a conveyor onto the platform when the platform is in the first position; and
    a second push arm or driven mechanism to push the tray from the platform to the conveyor.

22. A system for stacking and storing trays, comprising:
    a platform vertically moveable between a first position and a second position, the platform accommodating a tray;
    a first drive system connecting to the platform for raising and lowering the platform between the first position and the second position;
    opposing driven belts each of which includes a plurality of spaced apart lugs extending partially inward such that a space is provided between spaced apart lugs on the opposing driven belts, the spaced apart lugs being structured for capturing and storing the trays in a vertical, nested configuration:
    a second drive system connecting to the opposing driven belts for synchronously rotating the belts of the opposing driven belts in opposing directions; and
    a controller coordinating the movement of the opposing driven belts and the platform such that the platform is in the second position and the plurality of spaced apart lugs capture and lift the trays from the platform in a vertical, nested configuration, wherein:
    the first drive system is a belt drive coupled to the frame or platform for moving the platform between the raised and lowered position;

the opposing driven belts include a first driven belt mounted between a first set of shafts and a second driven belt mounted between a second set of shafts;

the second drive system includes a single drive shaft for synchronously driving the first and second driven belt;

the plurality of spaced apart lugs project towards each other when positioned between the opposing driven belts; and the plurality of spaced apart lugs are spaced at a predefined separation from one another on each of the opposing driven belts.

23. A method of buffering trays, comprising:

providing a tray onto a single platform which is mounted on a plate which is raised and lowered;

raising the platform with the tray to a stop mechanism;

biasing during raising the platform with a biasing system mounted between the platform and the plate;

synchronizing movement of a belt system of a buffering system with the raising of the tray such that when the tray is in the raised position, the tray will be captured between opposing lugs of the belt system of the buffering system; and lifting the tray from the platform and into the buffering system by engaging the opposing lugs with the tray such that trays become nested.

24. The method of claim 23, further comprising:

lowering the platform;

placing another tray on the platform;

raising the another tray until it is partly nested with the tray;

synchronizing movement of the buffering system with the raising of the another tray such that when the another tray is in the raised position, the another tray will be captured by the buffering system; and lifting the another tray from the platform and further nested the another tray with the tray.

* * * * *